3,707,535
PROCESS FOR PREPARING MONO- AND POLYGLYCOSIDES

Baak W. Lew, Ardentown, Del., assignor to Atlas Chemical Industries, Inc., Wilmington, Del.
No Drawing. Filed July 24, 1969, Ser. No. 844,651
Int. Cl. C07c 47/18
U.S. Cl. 260—210 R          11 Claims

ABSTRACT OF THE DISCLOSURE

Disclosed is an improved process for the preparation of glycosides which comprises reacting a compound selected from a group consisting of monosaccharides and compounds hydrolyzable to monosaccharides with a monohydric alcohol having from 8 to 25 carbon atoms, in the presence of an acid catalyst and in the presence of a solvent which is an aliphatic ether alcohol having a boiling point at atmospheric pressure of no more than about 200° C. The glycosides produced by the improved process of the present invention may be employed for a variety of purposes such as detergents, gelling agents, lubricants, wetting agents, dyeing assistants, textile softeners, and food emulsifiers.

---

The present invention relates to an improved process for the preparation of glycosides. More particularly, this invention relates to an improved process for the preparation of glycosides in which the alcohol moiety has high molecular weight and the glycoside is surface active.

It is known to produce alkyl monoglucosides by the Fischer process which involves feeding glucose and a lower alcohol together with an acid catalyst. This process is simple and economical. However, the process is inoperative when the alcohol moiety has more than about 3 or 4 carbon atoms due to the insolubility of the sugar in such higher alcohols.

It is known to prepare monoglycosides by the process of transglycosidation of methyl glycoside. This process, however, is subject to the same limitations as the Fischer method, that is, it is inoperative when applied to the higher alcohols.

Hexyl, octyl, nonyl, decyl, and dodecyl mono betaglucosides were made by Noller and Rockwell (J.A.C.S. 60 2076, 1938) using the well known Koenings-Knorr method. This multiple step method is cumbersome and expensive and is of no commercial importance.

U.S. Patent No. 3,219,656 shows the preparation of higher alkyl monoglycosides using a macroreticular-structured sulfonic acid resin in the anhydrous form as catalyst. Only such catalysts are disclosed and the patent states that glucose and higher molecular weight alcohols are non-reactive when using sulfuric acid, hydrochloric acid, mercuric acetate, and conventional or gel-type cation exchange resins as catalyst.

The above-described prior art methods for the production of alkyl glycosides produces only monoglycosides. Monoglycosides of alcohols having 12 or more carbon atoms are virtually insoluble in water, thus limiting their usefulness in many applications where water solubility is required.

U.S. patent application Ser. No. 703,539, entitled Polyglycosides and Process of Preparing Mono- and Polyglycosides, filed Feb. 7, 1968, now U.S. Patent 3,598,865 by Baak W. Lew, discloses a process for the preparation of high alkyl mono- and polyglycosides which process comprises reacting a monosaccharide or a compound hydrolyzable to a monosaccharide with a monohydric alcohol containing from 8 to 25 carbon atoms, in the presence of an acid catalyst selected from the group consisting of sulfuric acid, hydrochloric acid, phosphoric acid, phosphorus acid, toluene sulfonic acid, and boron trifluoride, and in the presence of a latent solvent which is a primary or secondary alcohol having from 3 to 5 carbon atoms. This process suffers from the disadvantages that large volumes of the latent solvent are required and that the process is feasible only with crystalline sugars.

It has now been discovered that it is possible to prepare high alkyl glycosides without using the large volumes of latent solvent and without using crystalline sugars as in the process of U.S. patent application Ser. No. 703,539.

In accordance with the present invention, glycosides are prepared by reacting a monosaccharide, or a compound hydrolyzable to a monosaccharide, with a monohydric alcohol containing from 8 to 25 carbon atoms, in the presence of an acid catalyst and in the presence of a solvent which is an aliphatic ether alcohol having a boiling point at atmospheric pressure at no more than about 200° C.

Monosaccharides from which glycosides of the present invention are prepared include the hexoses and pentoses. The term "monosaccharide" is extended to include compounds readily hydrolyzable to monosaccharides. Typical examples of suitable monosaccharides include glucose, mannose, galactose, talose, allose, altrose, idose, arabinose, xylose, lyxose, ribose, and the like. Among compounds readily hydrolyzable to monosaccharides may be named oligosaccharides and polysaccharides, such as starch, corn syrups, wood sugars, gums, maltose, sucrose, lactose, and raffinose, methyl glucosides, anhydro sugars such as levoglucosan and the like. For reasons of availability and low cost, the preferred starting product is glucose or a compound directly hydrolyzable to glucose.

The amount of ether-alcohol used may vary over a considerable range but no advantage accrues from using more than about 10 grams thereof per gram of monosaccharide. The aliphatic ether alcohols are so efficient as solvents that they may be employed in amounts as small as 0.75 gram per gram of monosaccharide. A preferred range of aliphatic ether-alcohols is from about 1 to about 5 grams thereof per gram of monosaccharide. For any given preparation, the particular ether-alcohol present will have a boiling point substantially below the boiling point of the higher alcohol employed.

Typical examples of ether-alcohols having boiling points no greater than about 200° C. which may be used as the latent solvent include 2-methoxy ethanol, 2-ethoxy ethanol, 2-propoxy ethanol, 2-butoxy ethanol, 2-methoxy propanol-1, 1-ethoxy propanol-2, methoxy butanol, diethylene glycol monomethylether, diethylene glycol monoethylether, and tetrahydrofurfuryl alcohol. The preferred ether-alcohol is 2-methoxy ethanol.

The acid catalyst used in the process of the present invention may be any acidic material or material which develops acidity under the conditions of the reaction. The preferred acid catalyst is sulfuric acid due to its low cost and ease of removal after the reaction is completed, although other acid catalysts, such as hydrochloride acid, phosphoric acid, phosphorus acid, boron trifluoride, toluene sulfonic acid, and ion exchange resins in acidic form may also be used. The amount of acid catalyst used may be between about 0.002% and about 2.0%, and preferably between about 0.005% and about 1.0%, based on the weight of the total charge. While less catalyst may be used, the time for the reaction is longer. While more catalysts may be used, it would be wasteful since the time of reaction is satisfactory at lower catalyst concentrations.

The monohydric alcohols containing from 8 to 25 carbon atoms used in the present invention may be primary or secondary alcohols, straight or branched chained, saturated or unsaturated, alkyl or aralkyl alcohols, ether alcohols, cyclic alcohols, or heterocyclic alcohols. In general, these alcohols are insoluble in water and have essentially no solvent power for the sugar molecule. Illustrative examples of the higher molecular weight alcohols which may be employed in the process of the present invention include octyl alcohol, nonyl alcohol, decyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, pentacosyl alcohol, oleyl alcohol, isoborneol, hydroabietyl alcohol, phenoxyethanol, phenoxypolyethoxyethanol containing 5 ethoxy groups, 1H, 1H, 11H-eicosafluoro-1-undecanol, 2-methyl 7-ethyl, 4-undecanol, and the like. A preferred range of alcohols are those having the formula ROH wherein R is an alkyl group containing from 8 to 25 carbon atoms. A particularly preferred group of alcohols are those wherein R is an alkyl group containing from 10 to 18 carbon atoms.

The molar ratio of high molecular weight alcohol to monosaccharide is suitably between about 0.01 to about 15 and preferably between about 0.05 to about 12. Although higher and lower ratios may be used, no advantage is gained thereby. A higher ratio results in more unreacted alcohol to be removed, and a lower ratio results in polysaccharide glycosides which have reduced surface active properties because of over glycosidation of the alcohol. The particular molar ratio to be used depends mainly on the amount of glycosidation desired on the alcohol. A low molar ratio is used to prepare glycosides containing more than 1 monosaccharide unit per alcohol moiety, that is polysaccharide glycosides. A high molar ratio is used when essentially monoglycosidation is desired. Thus, it is possible to adjust and select the hydrophile-lipophile balance and the water-solubility of the glycosides by controlling the extent of polyglycosidation.

The process of the present invention is suitably carried out at a temperature from 75° C. to 160° C., and preferably from 90° C. to 150° C. Although higher and lower temperatures may be used, no advantage is gained thereby. Lower temperatures result in longer reaction times, and higher temperatures may result in some degradation in certain instances.

The polysaccharide glycosides of the present invention are glycosides of reducing polysaccharides containing from 5 to 6 carbon atoms in each monomeric unit of the polysaccharide and a monohydric alcohol containing from 8 to 25 carbon atoms. These glycosides may be represented by the formula AOR wherein A is a monovalent radical resulting from the removal of a hydroxyl group from a reducing polysaccharide and is selected from the group consisting of $(C_{6n}H_{10n+1}O_{5n})$ and $(C_{5n}H_{8n+1}O_{4n})$ wherein $n$ is from 2 to 50 and R is a monovalent radical resulting from the removal of a hydroxyl group from a monohydric alcohol containing from 8 to 25 carbon atoms.

The glycosides of the present invention are advantageously employed for a variety of purposes, such as detergents, gelling agents, lubricants, wetting agents, dyeing assistants, textile softeners, and food emulsifiers.

The following are illustrative and preferred examples of the present invention. It will be appreciated, of course, that the proportions of reactants, time of reaction and temperature of reaction are somewhat variable; and selection of different sugars, alcohols, and catalysts can readily be effective in the light of the guiding principles and teachings which are disclosed herein. The examples, therefore, are not in any way to be construed as limitative of the scope of the present invention.

EXAMPLE 1

970 grams of E–081 syrup is concentrated in a three-liter flask provided with a stirrer, thermometer, and distillation column, under reduced pressure, to approximately 5% water content. E–081 is a product obtained in the glucose industry as mother liquor after the removal of as much glucose by crystallization as is commercially feasible from a starch hydrozylate. The material has a dextrose equivalent of 72–75, and a water content of 35% and the 65% solids consists of approximately 65% free glucose, with the rest being a complicated mixture of low molecular weight polymers of glucose. To the concentrated E–081 is added 630 grams of 2-methoxyethanol (equal to weight of sugar), 124 grams of n-decyl alcohol, and 0.49 ml. of concentrated sulfuric acid. The mixture is then refluxed for 45 minutes (118–119° C.), at which point the reflux is changed to distillation to remove 2-methoxy ethanol. After 15 minutes of distillation at atmospheric pressure, the temperature is at 132° C. Partial pressure is then applied to the distillation so that in 45 minutes the pressure is at 20 mm. mercury and the temperature is at 110–115° C. After 20 minutes of distillation under partial pressure, the reaction mixture is a porous, honey-combed solid cake, and the stirrer is turned off. The reaction is continued at 110–115° C. and 20 mm. mercury pressure for a total of 2 hours under reduced pressure. The porous cake is then broken up and the reaction is resumed by stirring to a fluidized bed at a temperature of 110–115° C. and 20 mm. mercury pressure for another 2 hours, at which time 98% of the 2-methoxy ethanol has been removed. Unreacted n-decyl alcohol was then removed by extraction with 700 ml. of acetone, filtration, and further washing with another 700 ml. of acetone and filtration. The dried product is a grayish powder and weighs 647 grams and contains 0.98% free reducing sugar and 2.2% free n-decyl alcohol. This yield indicates that this product is a mixture of n-decyl glucosides with an average of approximately 13 glucose units condensed onto each n-decyl alcohol unit.

EXAMPLE 2

A mixture of 150 grams of D-glucose, 318 grams of 2-methoxyethanol, 330 grams of n-decyl alcohol and 0.1 ml. of concentrated sulfuric acid is heated at reflux temperature (124–125° C.) for one hour in a one-liter flask, provided with stirrer, thermometer, and condenser. Ethylene glycol monomethyl ether is then distilled from the reaction mixture at atmospheric pressure for one half hour to a temperature of 130° C., at which time partial pressure is applied to the distillation. Distillation is carried out for a total of two hours under a reduced pressure of 30–40 mm. mercury at 100–105° C. at which time all of the 2-methoxyethanol has been distilled off. The catalyst is then neutralized by the addition of 0.18 gram of sodium hydroxide dissolved in 5 ml. of water. The unreacted n-decyl alcohol is then removed by distillation to a final temperature of 133° C. at 5 mm. mercury pressure. The resultant product is an amber color, slightly sticky solid. The product weighs 221 grams and contains 0.0% free reducing sugar and 4.0% free n-decyl alcohol. This indicates that the product is a mixture of n-decyl glucosides with an average of 1.8 glucose units condensed onto each n-decyl alcohol unit.

EXAMPLE 3

A mixture of 170 grams of cornstarch, 400 grams of 2-methoxy ethanol, and 0.83 ml. of concentrated sulfuric acid is refluxed for three hours (115–121° C.). There is then added to the resulting clear amber solution 363 grams of n-decyl alcohol. This solution is distilled at atmospheric pressure for 15 minutes until a temperature of 135° C. is reached, to remove a portion of the 2-methoxyethanol. Then partial pressure is applied to the distillation so that in 15 minutes the temperature is at 85° C. and the pressure is at 60 mm. mercury. During the next 15 minutes the pressure is reduced to 20 mm. mercury and the temperature held at 80–85° C. The distillation is then continued for a further two and one half hours at 85–90° C. and 20 mm. mercury pressure, at which time all of the 2-methoxy ethanol has been distilled off. The catalyst is then neutralized by the addition of 1.25 grams of anhydrous sodium carbonate dissolved in 5 ml. of water. The unreacted n-decyl alcohol is then removed by distillation to a final temperature of 135° C. at 7 mm. mercury pressure. The product is an amber slightly sticky solid. Analysis shows no free reducing sugar and 4.9% free n-decyl alcohol. Assuming a normal moisture content in the starch of 12%, this yield indicates that the product is a mixture of n-decyl glucosides with an average of 1.6 glucose units condensed onto each n-decyl alcohol unit.

EXAMPLE 4

A mixture of 630 grams of D-glucose, 1250 grams of diethylene glycol monoethyl ether, 124 grams of decyl alcohol and 0.7 ml. of concentrated sulfuric acid are refluxed for 2 hours, at which time the reflux is changed to distillation to remove diethylene glycol monoethyl ether. After 15 minutes of distillation at atmospheric pressure, the temperature is at 135° C. The pressure is gradually reduced so that in 45 minutes the pressure is 20 mm. of mercury and the temperature is at 110–115° C. After 30 minutes of distillation under partial pressure, the reaction mixture is a porous, honey-combed solid cake, and the stirrer is turned off. The reaction is continued at 110–115° C. and 10 mm. of mercury pressure for a total of 150 minutes under reduced pressure. The porous cake is then broken up and the reaction is resumed by stirring to a fluidized bed at a temperature of 105–110° C. and 10 mm. mercury pressure for another 150 minutes, at which time 97% of the diethylene glycol mono ethyl ether has been removed. The unreacted n-decyl alcohol is then removed by extraction with 700 ml. of acetone, filtration, and further washing with acetone. The dried product is grayish powder and weighs about 640 grams. Analysis indicates that the product is essentially a polyglucoside with approximately 12 glucose units.

EXAMPLE 5

A mixture of 300 grams of D-glucose, 650 grams of ethylene glycol monomethyl ether, 1000 grams of oxo-tridecyl alcohol, and 0.3 ml. of concentrated sulfuric acid is heated at reflux for 1.5 hours in a three liter flask fitted with a stirrer, thermometer and reflux condenser. The ethylene glycol monomethyl ether is then distilled from the reaction mixture at atmospheric pressure for 30 minutes to a temperature of 130° C., at which time partial pressure is applied to the distillation. Distillation is carried out for a total of 150 minutes under a reduced pressure of 30–40 mm. of mercury at 100–105° C., at which time all of the ethylene glycol monomethyl ether has been distilled off. The catalyst is then neutralized with sodium hydroxide. Any unreacted oxo-tridecyl alcohol is then removed by distillation to a final temperature of 135° C. at 5 mm. of mercury pressure. The resulting glucoside product is an amber color, slightly sticky solid.

Although this invention has been described with reference to specific aliphatic ether-alcohols, monohydric alcohols, monosaccharides, and acid catalysts as well as specific processes and method steps, it will be apparent that other equivalent materials may be substituted for those described and the method steps and types of processes may be altered, reversed, and in some cases eliminated all within the spirit and scope of this invention.

Having described the invention, what is desired to be secured by Letters Patent is:

1. In a process for the preparation of glycosides which comprises reacting a compound selected from the group consisting of monosaccharides and compound readily hydrolyzable to monosaccharides, with a monohydric alcohol containing from 8 to 25 carbon atoms, and in the presence of an acid catalyst, the improvement which consists essentially of conducting the reaction in the presence of a monohydric, saturated, aliphatic ether-alcohol having a boiling point at atmospheric pressure of no more than about 200° C.

2. A process of claim 1 wherein from about 0.01 to about 15 mols of the said monohydric alcohol is used per mol of said compound.

3. A process of claim 1 wherein from about 0.75 to about 10 grams of ether-alcohol is employed per gram of said compound.

4. A process of claim 1 wherein the amount of acid catalyst used is from about 0.002% to about 2.0% based on the weight of the total charge.

5. A process of claim 1 wherein the compound is glucose.

6. A process of claim 1 wherein the reaction is carried out at a temperature from about 75° C. to about 160° C.

7. A process of claim 1 wherein from about 0.01 to about 15 mols of said monohydric alcohol is used per mol of said compound, wherein from about 0.75 to about 10 grams of the ether-alcohol is employed as solvent per gram of said compound, wherein the amount of acid catalyst used is from about 0.002% to about 2.0% based on the weight of total charge, and wherein the reaction is carried out at a temperature from about 75° C. to 160° C.

8. A process of claim 1 wherein from about 0.05 to about 12 mols of the said monohydric alcohol is used per mol of the said compound, wherein from about 1 to about 5 grams of the ether-alcohol is employed as solvent per gram of said compound, wherein the amounts of acid catalysts employed is from about 0.005% to about 1.0% based on the weight of total charge, and wherein the reaction is carried out at a temperature from about 90° C. to about 150° C.

9. A process of claim 8 wherein the monosaccharide is glucose.

10. A process of claim 8 wherein the said compound is glucose or a compound directly hydrolyzable to glucose and the acid catalyst is sulfuric acid.

11. A process of claim 1 wherein the aliphatic ether-alcohol is 2-methoxy ethanol.

| | | | |
|---|---|---|---|
| 2,407,003 | 9/1946 | Griffin | 260—210 R |
| 3,219,656 | 11/1965 | Boettner | 260—210 R |
| 3,277,076 | 10/1966 | Yotsuzuka | 260—210 R |

LEWIS GOTTS, Primary Examiner

J. R. BROWN, Assistant Examiner